(12) United States Patent
Goodman et al.

(10) Patent No.: US 6,782,357 B1
(45) Date of Patent: Aug. 24, 2004

(54) CLUSTER AND PRUNING-BASED LANGUAGE MODEL COMPRESSION

(75) Inventors: Joshua Goodman, Redmond, WA (US); Jianfeng Gao, Beijing (CN)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/565,608

(22) Filed: May 4, 2000

(51) Int. Cl.$^7$ .................. G06F 17/27; G06F 17/20; G10L 15/00
(52) U.S. Cl. ................. 704/9; 704/257; 704/1
(58) Field of Search ............... 704/1, 9, 10, 255, 704/257

(56) References Cited

U.S. PATENT DOCUMENTS

| | | | | |
|---|---|---|---|---|
| 5,835,893 A | * | 11/1998 | Ushioda | 704/257 |
| 6,314,339 B1 | * | 11/2001 | Rastegar et al. | 704/257 |
| 6,317,707 B1 | * | 11/2001 | Bangalore et al. | 704/9 |
| 6,415,248 B1 | * | 7/2002 | Bangalore et al. | 704/1 |

OTHER PUBLICATIONS

H Yamamoto, Y Sagisaka, Multi–class Composite N–gram based on Connection Direction, in Proceedings of the IEEE Int'l Conf on Acoustics, Speech and Signal Processing, May 1999, Phoenix, AZ.
K. Seymore, R. Rosenfeld, Scalable backoff language models, in Proc ICSLP, vol. 1, pp 232–235, Philadelphia 1996.
C. Samuelsson, W. Reichl, A Class–based Language Model for Large–vocabulary Speech Recognition Extracted from Part–of–Speech Statistics, vol 1, paper No. 1781, ICASSP 1999.
R. Kneser, Statistical language modeling using a variable context length, Proc. ICSLP '96, Philadelphia, PA, Oct. 1996, vol 1, pp. 494–497.

K. Ries et al, Class phsrae models for language modeling, Proc. ICSLP'96, Philadelphia, PA, Oct. 1996, vol 1.
I. Guyon, F. Pereira, Design of a linguistic postprocessor using variable memory length Markov models, In International Conference on Document Analysis and Recognition, pp. 454–457, Montreal, Canada, IEEE Computer Society Press. 1995.
M. Kearns, Y. Mansour, A. Ng, An information–theoretic Analysis of hard and soft assignment methods for clustering, Proceedings of the 13$^{th}$ Conf on Uncertainty in AI, 1997.
B. Suhm, A. Waibel, Towards better language models for spontaneous speech, Proceedings of ICSLP, 1994.
S. Bai et al, Building class–based language models with contextual statistics, Proceedings of ICASSP, 1998.
Melia, Heckerman, An experimental comparison of several clustering and initialization methods, Proceedings of the 14$^{th}$ Conf on uncertainty in AI, 1998.
J. Bellegarda et al, A novel word clustering algorithm based on latent semantic analysis, Proceedings of ICASSP, 1996, vol. 1.

(List continued on next page.)

*Primary Examiner*—Patrick N. Edouard
(74) *Attorney, Agent, or Firm*—Theodore M. Magee; Westman, Champlin & Kelly, P.A.

(57) ABSTRACT

Cluster- and pruning-based language model compression is disclosed. In one embodiment, a language model is first clustered, such as by using predictive clustering. The language model after clustering has a larger size than it did before clustering. The language model is then pruned, such as by using entropy-based techniques, such as Rosenfeld pruning, or by using Stolcke pruning or count-cutoff techniques. In one particular embodiment, a word language model is first predictively clustered by a technique described as P(Z|xy)×P(z|xyZ), where a lower-case letter refers to a word, and an upper-cluster letter refers to a cluster in which the word resides.

38 Claims, 4 Drawing Sheets

OTHER PUBLICATIONS

Niesler et al, Comparison of part–of–speech and automatically derived category–based language models for speech recognition, Proceedings of ICASSP, 1998.

Miller, Alleva, Evaluation of a language model using a clustered model backoff, Proceedings of ICSLP, 1996, vol. 1.

Bahl, Brown, et al, A tree–based statistical language model for natural language speech recognition, IEEE Transactions on Acoustics, Speech and Signal Processing, vol. 37, No. 7, 1989.

Willems et al, Reflections on "The Context–tree weighting Method: Basic properties," the *IEEE Transactions on Information Theory*, vol. IT–41, No. 3, May 1995.

Jardino, Multilingual Stochastic N–gram class language models, Proceedings of ICASSP, 1996.

Ward, Issar, A class based language model for speech recognition, Proceedings of ICASSP, vol. 1, 1996.

Blasig, Combination of words and word categories in varigram histories, Proceedings of ICASSP, 1999.

L Lee, Measures of distributional similarity, Proceedings of the $37^{th}$ annual meeting of the Assn for Computational Linguistics, (Conference), Jun. 20–26, 1999.

Ueberla, More efficient clustering of n–grams for statistical language modeling, Eurospeech 1996, pp. 1257–1260.

Chen, Goodman, An empirical study of smoothing techniques for language model, TR–10–98, Computer science Group, Harvard University, 1998.

Ney et al, On structuring probabilistic dependencies in stochastic language modeling, Computer Speech and Language 1994 (8), 1–38.

Stolcke, Entropy–based pruning of backoff language models, in proceedings ICSLP, vol 1, pp 232–235, Philadelphia, 1996.

Brown, Della Pietra, deSouza, et al, Class–based n–gram models of natural language, Computational Linguistics 1990 (18), 467–479.

R. Kneser, H. Ney, Improved clustering techniques for class–based statistical language modeling, in Eurospeech, vol. 2, pp. 973–976, 1993, Berlin, Germany.

F. Jelinek, Self organized langauge modeling for speech recognition, in Readings in Speech Recognition, Alex Waibel and Kai–Fu Lee (Eds.), Morgan Kaufmann.

* cited by examiner

US 6,782,357 B1

CLUSTER AND PRUNING-BASED LANGUAGE MODEL COMPRESSION

FIELD OF THE INVENTION

The invention relates generally to statistical language models, and more particularly to compression of such models (e.g., n-gram language models).

BACKGROUND OF THE INVENTION

A common application today is the entering, editing and manipulation of text. Application programs that perform such text operation include word processors, text editors, and even spreadsheets and presentation programs. For example, a word processor allows a user to enter text to prepare documents such as letters, reports, memos, etc. While the keyboard has historically been the standard input device by which text input is performed into these type of application programs, it is currently being augmented and/or replaced by other types of input devices. For example, touch-sensitive pads can be "written" on with a stylus, such that a handwriting recognition program can be used to input the resulting characters into a program. As another example, voice-recognition programs, which work in conjunction with microphones attached to computers, also are becoming more popular. Especially for non-English language users, and particularly for Asian language users, these non-keyboard type devices are popular for initially inputting text into programs, such that they can then be edited by the same device, or other devices like the keyboard. Speech and handwriting recognition have applications beyond text entry as well.

A primary part of the use of handwriting or speech recognition is the selection of a language model that is used to determine what a user writes or speaks should be translated to. In general, the more sophisticated a language model is, the more space it needs for storage. This is unfortunate especially in situations where storage space is at a premium, such as in handheld- and palm-oriented computing devices. Therefore, the compression of such models is typically necessary. The performance, or measure of accuracy, of a language model is determined typically based on what is known in the art as the perplexity of the model. Prior art language model compression techniques, while reducing the size of the resulting compressed model, also disadvantageously increase the perplexity, and hence reduce the accuracy, of the model. Such compression techniques that result in a reduced-size and increased-perplexity language model include only pruning the language model, and using what is referred to as "classical" clustering that by virtue of the clustering itself reduces the size of the model, but which increases the perplexity of the model.

Therefore, there is a need within the prior art for compressing language models that result in smaller-sized models, but with as limited an increase in perplexity as possible. For this and other reasons, therefore, there is a need for the present invention.

SUMMARY OF THE INVENTION

The invention relates to the cluster- and pruning-based compression of language models. In one embodiment, words are first clustered, such that the resulting language model after clustering has a larger size than it did before clustering. Clustering techniques amenable to the invention include but are not limited to predictive clustering and conditional clustering. The language model, as clustered, is then pruned. Pruning techniques amenable to the invention include but are not limited to entropy-based techniques, such as Stolcke pruning, as well as count-cutoff techniques and Rosenfeld pruning. In one particular embodiment, a word language model is first predictively clustered, using a novel predictive clustering technique, and then is pruned utilizing Stolcke pruning.

Embodiments of the invention provide for advantages not found within the prior art. Unintuitively and nonobviously, embodiments of the invention initially cluster a language model such that it has a larger size than it did before being clustering. The subsequent pruning of the model then results in a compressed language model that has a smaller size for a given perplexity level as compared to prior art language model compression techniques. Embodiments of the invention also result in a compressed language model that has lower perplexity for a given size of model as compared to prior art language model compression techniques.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
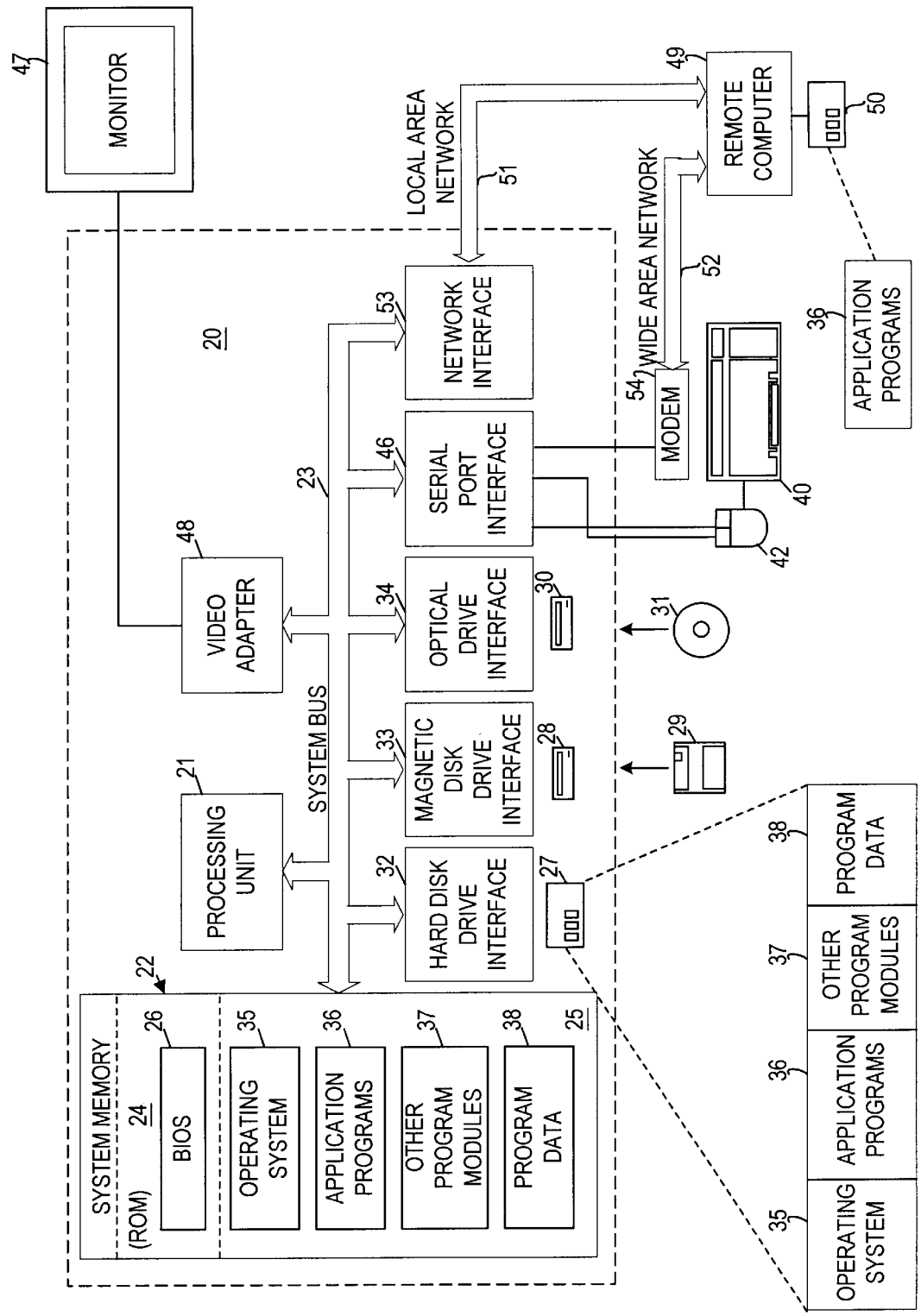
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Translation of Raw Data into Recognized Data

In this section of the detailed description, the translation of raw data into recognized data, utilizing a language model as can be compressed in accordance with embodiments of the invention, is described. For example, the raw data can be graphical data that is translated into recognized data via handwriting recognition, where the recognized data can be textual characters representing the graphical data. As another example, the raw data can be voice data that is translated into recognized data via speech recognition, where the recognized data can be textual words representing the graphical data. The invention is not so limited, however.

Figure 2:
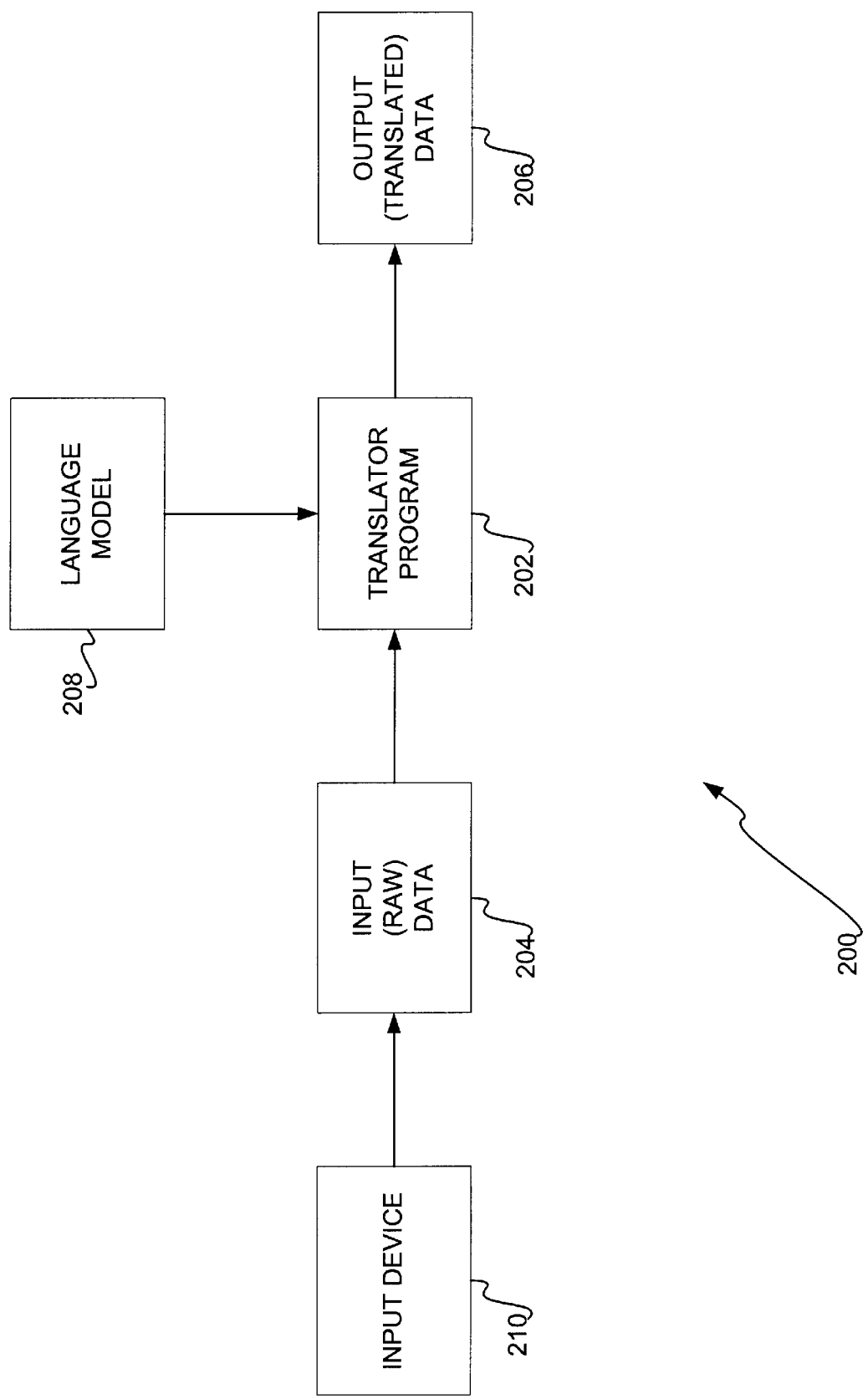
FIG. 2 is a diagram of a system according to an embodiment of the invention.

Referring to FIG. 2, a diagram of a system 200 in conjunction with which embodiments of the invention can be implemented is shown. The system 200 is such that a translator computer program 202 translates raw input data 204 initially generated by an input device 210 into translated output data 206, utilizing a language model 208. The computer program 202 in one embodiment is executed by a processor from a computer-readable medium, both of which can be a part of a computer, such as the computer described previously in conjunction with FIG. 1. The language model 208 can be compressed in accordance with embodiments of the invention, as is described in succeeding sections of the detailed description.

For example, the input device 210 can be a touch-sensitive pad on which a user "writes" utilizing a stylus, such that the input data 204 is graphical data representing what the user wrote on the pad with the stylus. In such an example, the translator program 202 is a handwriting recognition program, and the output data 206 can be textual characters representing what the user intended to write on the input device 210, although the invention is not so limited. As another example, the input device 210 can be a microphone into which a user speaks, such that the input data 204 is voice data representing what the user spoke into the microphone. In this example, the translator program 202 is a speech recognition program, and the output data 206 can be textual words representing what the user intended to say into the input device 210, although the invention is not so limited. Furthermore, in another embodiment, the input data 204 includes phonetic alphabet data, such that the computer program 202 is designed to convert the phonetic alphabet data to character alphabet data. For example, the phonetic alphabet data can be in a Chinese language, in Japanese, or in other languages as well.

Overview

In this section of the detailed description, an overview as to how embodiments of the invention compress language models is presented. The presentation is made in conjunction with FIG. 4, which is a diagram of such an overview according to an embodiment of the invention. The diagram 400 of FIG. 4 starts with an original, desirably uncompressed, language model 402a. The language model 402a is clustered, as indicated by the arrow 404, resulting in a transformed language model 402b that has an increased size as compared to the original language model 402a. Thus, language model compression in accordance with embodiments of the invention initially is performed by the unintuitive increasing of the size of the model via clustering.

Figure 4:
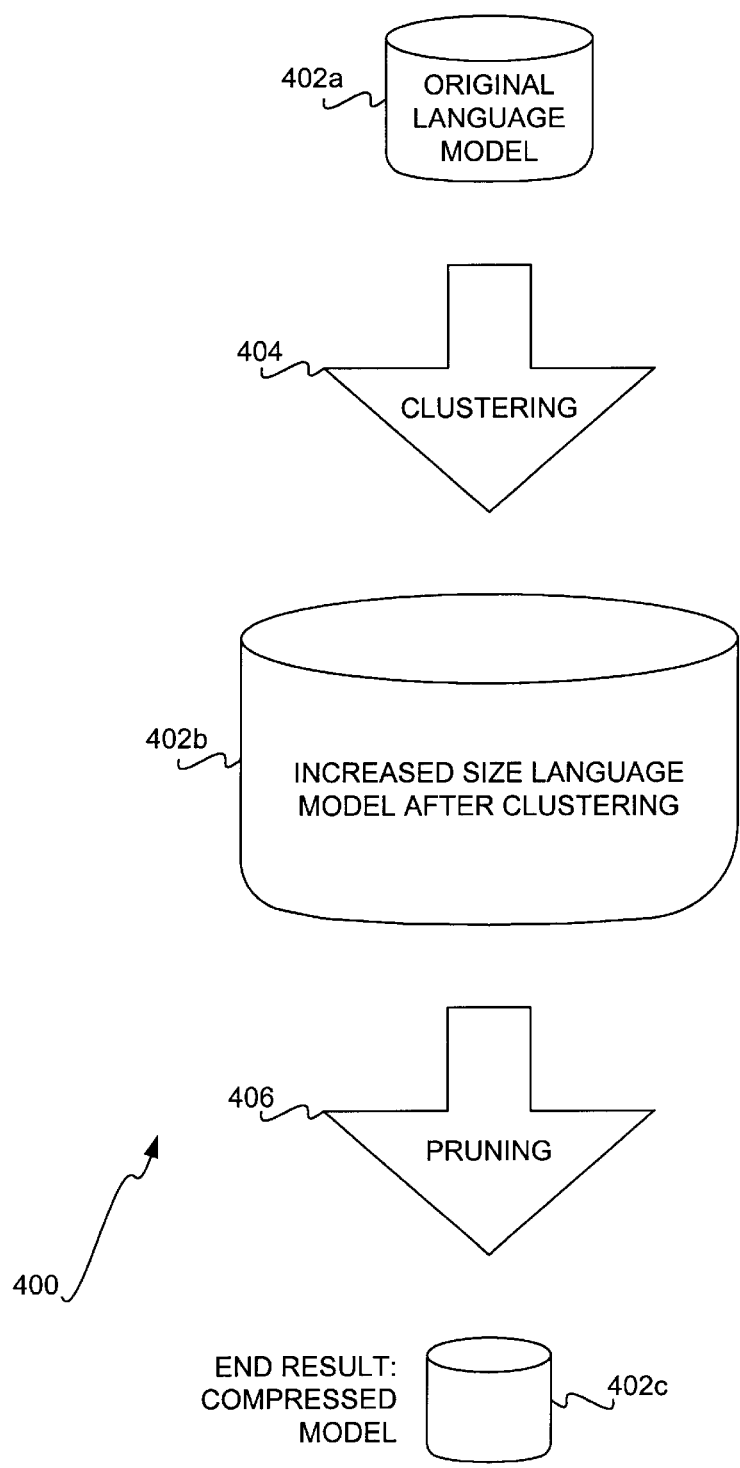

The language model 402b is then pruned, as indicated by the arrow 406, resulting in a compressed language model 402c that has a smaller size as compared to the original language model 402a. The relative sizes of the models 402a, 402b and 402c in actuality thus correspond to their relative sizes as shown in FIG. 4. In the following sections of the detailed description, pruning, clustering, and model compression via clustering and pruning are presented in further and more particular description of embodiments of the invention.

Language Models and Pruning

In this section of the detailed description, language models and pruning are presented. As has been described, language models are useful for speech recognition and handwriting recognition, and can also be used in spelling correction and other areas. A language model assigns probabilities to word sequences. This can be helpful, for example, in disambiguating acoustic inputs. For instance, a speech recognizer could compare P("Recognize speech") to P("Wreck a nice beach") to determine that the former was more probable than the latter, although both sound similar. In general, determining probabilities of the form $P(w_1 w_2 \ldots w_n)$ where $w_1 w_2 \ldots w_n$ are the first, second, through last words of a sentence is very difficult. Instead, conditional probabilities are usually determined, where $$P(w_1 \ldots w_n) = \prod_{i=1}^{n} P(w_i | w_1 \ldots w_{i-1}). \tag{1}$$

One approach to modeling these conditional probabilities is to use n-gram models. For instance, in a trigram model, the probability of a word is assumed to depend only on the two previous words:

$$\prod_{i=1}^{n} P(w_i | w_1 \ldots w_{i-1}) \approx \prod_{i=1}^{n} P(w_i | w_{i-2} w_{i-1}) \tag{2}$$

An estimate for the probability $P(w_i | w_{i-2} w_{i-1})$ is, $$\frac{C(w_{i-2} w_{i-1} w_i)}{C(w_{i-2} w_{i-1})},$$

where $C(w_{i-2} w_{i-1} w_i)$ represents the number of times the sequence $w_{i-2} w_{i-1} w_i$ occurs in some training text (the count). A difficulty with this approximation is that for word sequences that do not occur in the training text, where $C(w_{i-2} w_{i-1} w_i) = 0$, the predicted probability is 0. This makes it very difficult or impossible for a system, such as a handwriting system, to accept such a 0 probability sequence.

Because of this, these probabilities are typically smoothed, as known within the art: some probability is removed from all non-zero counts, and used to add probability to the 0 count items. The added probability is typically in proportion to some less specific, but less noisy model. For instance, a trigram will typically back off to a bigram $P(w_i | w_{i-1})$ and the bigram will typically back off to a unigram, $P(w_i)$. Formally, letting D represent a discount, and using the Absolute Discounting backoff method, the probability is set as follows:

$$P_{absolute}(w_i \mid w_{i-2}w_{i-1}) = \qquad (3)$$

$$\begin{cases} \dfrac{C(w_{i-2}w_{i-1}w_i) - D}{C(w_{i-2}w_{i-1})} & \text{if } C(w_{i-2}w_{i-1}w_i) > 0 \\ \alpha(w_{i-2}w_{i-1})P_{absolute}(w_i \mid w_{i-1}) & \text{otherwise} \end{cases}$$

$\alpha(w_{i-2}w_{i-1})$ is a normalization factor, and is defined in such a way that the probabilities sum to 1. The bigram is defined similarly to the trigram, backing off to the unigram. The unigram does not typically need to be smoothed. In practice, a different D is used for the bigram and trigram.

A further improvement is to use multiple discounts D, one for counts $C(w_{i-2}w_{i-1}w_i)=1$, another for $C(w_{i-2}w_{i-1}w_i)=2$, and a final one for $C(w_{i-2}w_{i-1}w_i) \geq 3$. Storing a language model of this form typically includes storing the probabilities $P_{absolute}(w_i \mid w_{i-2}w_{i-1})$ for which $C(w_{i-2}w_{i-1}w_i) > 0$, as well as the $\alpha$'s. However, if the training text used to obtain the counts is large, the total number of parameters that need to be stored can also be quite large; typically, it is similar in size to the size of the training data. The more training data that is used, the better the language model, but since there may be billions of words of training data available, a full model cannot usually be used in practice.

In practice, then, typically not all counts are stored. A common way to eliminate "unused" counts is by means of "count cutoffs". A cutoff is chosen, say 2, and all probabilities stored in the system with 2 or fewer counts are removed. Separate cutoffs can be chosen for bigram and trigram counts. Improvements have also been made over count cutoffs, including what is referred to in the art as Rosenfeld pruning and Stolcke pruning. The latter is a relative entropy-based technique, while the former is based on weighted difference, as known within the art. With respect to Stolcke pruning, consider a trigram such as P(City|New York), with its bigram P(City|York): the two probabilities are almost equal. On the other hand, consider P(hand|the other) versus P(hand|other): the former probability is much larger than the latter. Thus, P(City|New York) can safely be pruned away, but not P(hand|the other). It might be the case that both have the same number of counts—the key insight is that counts are not what count: differences in probability are what count (actually, differences in relative entropy).

The compression technique using in accordance with embodiments of the invention is based on clustering, but can also be used with count cutoffs, Rosenfeld pruning, Stolcke pruning, as known within the art, as well as other pruning techniques. Clustering is now described.

Clustering

In this section of the detailed description, clustering is described. After the presentation of clustering, the use of clustering in accordance with pruning techniques in conjunction with embodiments of the invention, to produce significantly smaller language models, is described in the next section of the detailed description.

Consider a probability such as P(Tuesday|party on). Perhaps the training data contains no instances of the phrase "party on Tuesday", although other phrases such as "party on Friday" and "party on Saturday" do appear. If the words are put into classes, such as the word Tuesday into the class WEEKDAY, the probability can be decomposed:

$$P(\text{Tuesday}|\text{party on}) = P(\text{WEEKDAY}|\text{party on}) \times P(\text{Tuesday}|\text{party on WEEKDAY}) \qquad (4)$$

When each word belongs to only one class, this decomposition is a strict equality, a fact which can be trivially proven.

Let XYZ represent the clusters of words xyz, respectively—that is, a lower case letter refers to a word, and an upper case letters refers to the cluster in which the word resides. Then, $$P(Z|xy) \times P(z|xyZ) = P(xyZ)/P(xy) \times P(xyZz)/P(xyZ) = P(xyZz)/P(xy) \qquad (5)$$

Now, since each word belongs to a single cluster, $P(Z|z)=1$, and thus $$P(xyz) = P(xyz) \times P(Z|xyz) = P(xyz) \times P(Z|z) = P(xyz) \qquad (6)$$

Substituting Equation (6) into (5), $$P(Z|xy) \times P(z|xyZ) = P(xyz)/P(xy) = P(z|xy) \qquad (7)$$

Although this clustering equation is a strict equality, when smoothing is taken into consideration, using the clustered probability will be more accurate than the non-clustered probability. For instance, even if an example of "party on Tuesday" has never been seen, perhaps examples of other phrases, such as "party on soup" have been, and thus, the probability P(WEEKDAY|party on) will be relatively high. And although an example of "party on WEEKDAY Tuesday" may never have been seen, after backoff or interpolation with a lower order model, P(Tuesday|on WEEKDAY) may be able to be accurately estimated. Thus, the clustered estimate may be a good one. This particular kind of clustering is referred to herein as predictive clustering.

Furthermore, clustering can also be performed as to the words that are being conditioned on. For instance, if "party" is in the class EVENT and "on" is in the class "PREPOSITION", then $$P(\text{Tuesday}|\text{party on}) \approx P(\text{Tuesday}|\text{EVENT PREPOSITION}) \qquad (8)$$

This kind of clustering is referred to herein as conditional clustering, and is generally written as P(z|XY).

It is also possible to combine both predictive and conditional clustering, and, in fact, for some applications, this combination works better than either one separately. Thus, $$P(\text{Tuesday}|\text{party on}) = P(\text{TUESDAY}|\text{EVENT PREPOSITION}) \times P(\text{Tuesday}|\text{EVENT PREPOSITION WEEKDAY}) \qquad (9)$$

or, as is more typically written, $$P(Z|XY) \times P(Z|XYZ). \qquad (10)$$

As can be appreciated by those of ordinary skill within the art, there are other clustering techniques than those that have been described. For example $$P(z|Z) \times P(Z|XY) \qquad (11)$$

can be used. This approximation can be linearly interpolated with standard models known within the art, (using an interpolation constant $\lambda$ optimized on held-out data)

$$\lambda P(z|xy) + (1-\lambda)P(z|Z) \times P(Z|XY) \qquad (12)$$

An improvement to this is:

$$\lambda P(z|xy) + (1-\lambda)P(z|XYZ) \times P(Z|XY) \qquad (13)$$

There is no need for the clusters used for the predictive clustering and the conditional clustering to be the same. For instance, consider a pair of words like "a" and "an". In general, "a" and "an" can follow the same words, and so, for predictive clustering, belong in the same cluster. But, there are very few words that can follow both "a" and "an"—so for conditional clustering, they belong in different clusters.

Furthermore, it has been found that the optimal number of clusters used for predictive and conditional clustering are different; for instance, 64 clusters can be typically used for the conditional clusters, and about 4096 clusters for the predictive clusters, when doing language model compression.

The clusters are found by attempting to minimize perplexity. Perplexity is a measure of language model performance; typically, the lower the perplexity of a language model, the more accurate it will be in practice. As is used below, $W_{i-1}$ represents the cluster of word i-1 in the document. The notation $P(z|Y)$ and $P(w_i|W_{i-1})$ are used almost interchangeably, where the former is used more often, the latter is used when we need to take products of probabilities over the entire document. In particular, for the conditional clusters, the perplexity of training data for a bigram of the form $P(z|Y)$ or, equivalently, $P(w_i|w_{i-1})$, is attempted to be minimized, which is the same as maximizing $$\prod_{i=1}^{N} P(w_i | W_{i-1}) \tag{14}$$

For the predictive clusters, the perplexity of training data of $P(Z|y) \times P(z|Z)$ is attempted to be minimized. Then, $$P(Z|y) \times P(z|Z) = \frac{P(yZ)}{P(y)} \times \frac{P(zZ)}{Z} \tag{15}$$
$$= \frac{P(zZ)}{P(y)} \times \frac{P(yZ)}{Z}$$
$$= \frac{P(z)}{P(y)} \times P(y|Z)$$

$$\frac{P(z)}{P(y)}$$

is independent of the clustering used; therefore, it is sufficient to try to maximize the product over $P(y|Z)$, which is $$\prod_{i=1}^{N} P(w_{i-1} | W_i).$$

This is very convenient, since it is exactly the opposite of what was done for conditional clustering. It means that that the same clustering approach can be used for both, where the order used to obtain the raw counts for clustering is switched.

Using Clustering and Pruning for Compression

In this section of the detailed description, using clustering for language model compression is described. Within the prior art, clustering has been used by itself for language model compression. In particular, the approach $P(z|Z) \times P(Z|XY)$ has been used by itself to reduce the size of the language model (i.e., compressing it), but at the cost of worse perplexity. This approach is referred to herein as "classical" clustering.

Embodiments of the invention, on the other hand, utilize a clustering approach that unintuitively and counter-intuitively increases the size of the resulting model, and then utilizing a pruning technique to reduce the size of the model. In one embodiment, a novel clustering approach $P(Z|xy) \times P(z|xyZ)$ is used. The resulting model is typically larger than the original. However, after applying an appropriate pruning technique, such as Stolcke pruning, the resulting model is smaller than the original model would be, when pruned with the same technique, at the same perplexity. That is, a larger, better model is first created by using clustering (that is, clustering is not by itself used for compression), and then this larger model is pruned to result in a compressed model as compared to the original model.

In another embodiment of the invention, the clustering approach $P(Z|XY) \times P(z|XYZ)$ is used. The resulting model is also larger than the original, although not as large as $P(Z|xy) \times P(z|xyZ)$ would be. Thus, clustering, such as predictive clustering, is used by embodiments of the invention to create a larger language model, that can then be pruned with another technique, such as Stolcke pruning, Rosenfeld pruning, or count cutoffs, to yield an ultimately smaller model.

Fast Pruning Values

In this section of the detailed description, fast pruning values, in accordance with an embodiment of the invention, are described. It is noted that the pruning values used for Stolcke pruning are typically the same for bigrams and trigrams, but are typically different for the $P(Z|xy)$ and $P(z|xyZ)$ models and need to be found empirically. However, the approach described in this section is used to make this process easier. This process can be used with most pruning techniques, including Rosenfeld pruning, Stolcke pruning, and count-cutoffs.

Typically, as has been described, the performance, or accuracy, of a language model is measured by its perplexity, which is equal to $$\sqrt[N]{\prod_{i=1}^{N} \frac{1}{P(w_i | w_{i-2} w_{i-1})}} \tag{16}$$

Now, since $P(w_i|w_{i-2}w_{i-1}) = P(W_i|w_{i-2}w_{i-1}) \times P(w_i|w_{i-2}w_{i-1}W_i)$ is used, $$\sqrt[N]{\prod_{i=1}^{N} \frac{1}{P(w_i | w_{i-2} w_{i-1})}} = \sqrt[N]{\prod_{i=1}^{N} \frac{1}{P(W_i | w_{i-2} w_{i-1}) \times P(w_i | w_{i-2} w_{i-1} W_i)}} \tag{17}$$

$$= \sqrt[N]{\prod_{i=1}^{N} \frac{1}{P(W_i | w_{i-2} w_{i-1})}} \times$$

$$\sqrt[N]{\prod_{i=1}^{N} \frac{1}{P(w_i | w_{i-2} w_{i-1} W_i)}}$$

In other words, the perplexity of the two models is determined separately, according to the above equations, and then, to find their combined perplexity, their product is taken. This is especially useful when trying to find the correct settings of the pruning parameters. In particular, it can be desirable to find the best setting of the pruning parameters such that the total size of the models is less than some maximum. The following approach can be used:

1. For a variety of pruning values, find models for $P(Z|xy)$; determine the size and perplexity of the model.
2. For a variety of pruning values, find models for $P(z|xyZ)$; determine the size and perplexity of the model.
3. Now, determine the sizes and perplexities of the pairs of models, by adding the sizes and multiplying the perplexities.

Using the results of step 3, some optimal model can be quickly determined, such as the lowest perplexity combination subject to the maximum size constraint, or the smallest model subject to some maximum perplexity constraint, or some other desirable tradeoff.

Methods

In this section of the detailed description, methods according to varying embodiments of the invention are described. The methods can in some embodiments be computer-implemented. A computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer, such as that described in conjunction with FIG. 1 in a previous section of the detailed description. The invention is not so limited, however. The embodiments of the invention described in this section utilize clustering and pruning as have been described in previous sections of the detailed description.

Figure 3:
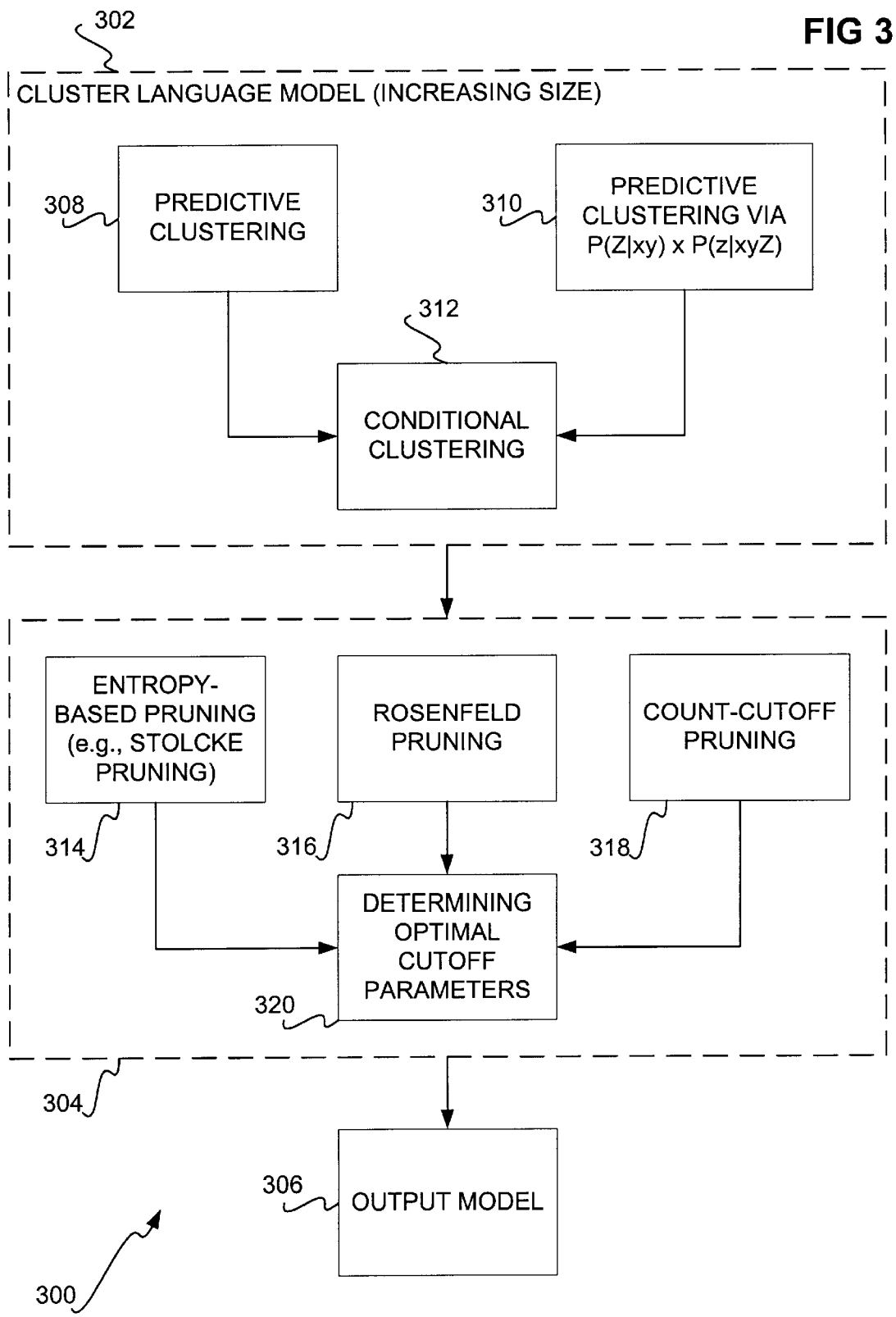
FIG. 3 is a flowchart of a method according to an embodiment of the invention; and, FIG. 4 is a diagram showing an overview of operation of an embodiment of the invention on a language model to compress the model.

Referring to FIG. 3, a flowchart of a method 300 for compressing a language model, such as a word language model, is shown. The method has three primary parts: first, in 302, the language model is initially clustered, resulting in a model having a size greater than pre-clustering; next, in 304, the language model after clustering is pruned, resulting in a compressed model that is smaller in size than the original model; and, in 306, the compressed language model is output. Each of these parts of the method 300 is now described in turn.

In 302, clustering of the language model can in one embodiment be performed either in 308 by predictive clustering, or, more particularly, in 310, by predictive clustering via the approach described previously as $P(Z|xy) \times P(z|xyZ)$. From either 308 or 310, the method then proceeds to 312, where in one embodiment conditional clustering is further performed on the model. It is noted that performance of 312 is optional. Furthermore, clustering can also be performed other than by predictive clustering as in 308 or 310.

In 304, pruning of the language model as clustered can in one embodiment be performed in 314 by entropy-based pruning (e.g., Stolcke pruning), in 316 by Rosenfeld pruning, or in 318 by count-cutoff pruning. Each of these techniques has already been described in detail in previous sections of the detailed description. From either 314, 316 or 318, the method then proceeds to 320, where in one embodiment optimal cutoff parameters for the pruning are determined, as has also been previously described. It is noted that performance of 320 is optional. Furthermore, pruning can also be performed other than by entropy-based, Rosenfeld, or count-cutoff pruning as in 314, 316 or 318.

As has been noted, in 306, in one embodiment, the language model as clustered and pruned (that is, as compressed) is output. The invention is not limited to the manner by which output is accomplished. For example, in one embodiment, output can be to a further translation program or software component, that allows for translation of raw data to recognized data, as has been described. As another example, output can be displayed on a displayed device, or printed to a printer, etc. As a third example, output can be stored on a storage device, for later further translation by a program or software component.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A computer-implemented method for compressing a word language model comprising:

predictive clustering the word language model, such that the model after clustering has a larger size than before clustering and the word language model provides parameter values that describe the probabilities in a function $P(Z|xy) \times P(z|xyz)$, where a lower-case letter refers to a word, and an upper-case letter refers to a cluster in which the word resides; and, pruning the word language model as clustered utilizing an entropy-based pruning technique.

2. The method of claim 1, wherein the entropy-based pruning technique comprises Stolcke pruning.

3. A computer-implemented method for compressing a language model comprising:

clustering the language model such that the language model provides parameter values that describe the probabilities in a function $P(Z|xy) \times P(z|xyZ)$, where a lower-case letter refers to a word, and an upper-case letter refers to a cluster in which the word resides, such that the language model after clustering has a larger size than before clustering; and, pruning the language model.

4. The method of claim 3, wherein the language model comprises a word language model.

5. The method of claim 3, wherein clustering the language model comprises predictive clustering the language model.

6. The method of claim 3, wherein the model is further conditionally clustered, utilizing a technique described as $P(Z|XY) \times P(Z|XYZ)$.

7. The method of claim 3, wherein pruning the language model comprises utilizing an entropy-based pruning technique.

8. The method of claim 7, wherein utilizing the entropy-based pruning technique comprises determining optimal pruning parameters.

9. The method of claim 7, wherein utilizing the entropy-based pruning technique comprises Stolcke pruning.

10. The method of claim 3, wherein pruning the language model comprises utilizing one of Rosenfeld pruning and a count-cutoff technique.

11. The method of claim 10, wherein pruning the language model further comprises determining optimal cutoff parameters.

12. A machine-readable medium having stored thereon data representing a language model compressed by performance of a method comprising:

clustering the language model utilizing a technique such that the language model provides parameter values that describe the probabilities in a function $P(Z|XY) \times P(z|XYZ)$ where a lower-case letter refers to a word, and an upper-case letter refers to a cluster in which the word resides, such that the language model after clustering has a larger size than before clustering; and pruning the language model.

13. The medium of claim 12, wherein clustering the language model further comprises predictive clustering the language model.

14. The medium of claim 13, wherein predictive clustering the language model comprises utilizing a technique described as $P(Z|xy) \times P(z|xyZ)$, where a lower-case letter refers to a word, and an upper-case letter refers to a cluster in which the word resides.

15. The medium of claim 12, wherein pruning the language model comprises utilizing an entropy-based technique.

16. The medium of claim 15, wherein the entropy-based pruning technique comprises stolcke pruning.

17. The medium of claim 16, wherein Stolcke pruning the language model comprises determining optimal cutoff parameters.

18. The medium of claim 12, wherein pruning the language model comprises determining optimal cutoff parameters.

19. The medium of claim 12, wherein pruning the language model comprises utilizing one of: a count-cutoff technique, and Rosenfeld pruning.

20. A machine-readable medium having data stored thereon representing a computer program designed to translate raw data into recognized data utilizing a language model, the language model compressed via performance of a method comprising:

clustering the language model utilizing a technique such that the language model provides parameter values that describe the probabilities in a function $P(Z|xy) \times P(z|xyZ)$, where a lower-case letter refers to a word, and an upper-case letter refers to a cluster in which the word resides, such that the language model after clustering has a larger size than before clustering; and pruning the language model.

21. The medium of claim 20, wherein clustering the language model comprises predictive clustering the language model.

22. The medium of claim 20, wherein the model is further conditionally clustered, utilizing a technique described as $P(Z|XY) \times P(Z|XYZ)$.

23. The medium of claim 20, wherein pruning the language model comprises utilizing an entropy-based pruning technique.

24. The medium of claim 23, wherein utilizing an entropy-based pruning technique comprise determining optimal pruning parameters.

25. The medium of claim 20, wherein the entropy-based pruning technique comprises Stolcke pruning.

26. The medium of claim 20, wherein pruning the language model comprises one of: utilizing a count-cutoff technique, and Rosenfeld pruning.

27. The medium of claim 20, wherein pruning the language model comprises utilizing a count-cutoff technique and determining optimal pruning parameters.

28. The medium of claim 20, wherein the raw data comprises raw graphical data, and the computer program comprises a handwriting recognition program.

29. The medium of claim 20, wherein the raw data comprises raw voice data, and the computer program comprises a speech recognition program.

30. A computerized system comprising:

an input device generating raw data;

a language model compressed via being first clustered utilizing a technique such that the language model provides parameter values that describe the probabilities in a function $P(Z|XY) \times P(z|XYZ)$, where a lower-case letter refers to a word, and an upper-case letter refers to a cluster in which the word resides, such that the model after being clustered has a larger size than before being clustered, and then pruned; and, a computer program designed to translate the raw data into recognized data utilizing the language model.

31. The system of claim 30, wherein the language model is further predictively clustered.

32. The system of claim 30, wherein the language model is pruned utilizing an entropy-based pruning technique.

33. The system of claim 30, wherein the language model is pruned utilizing one of: a count-cutoff technique, and Rosenfeld pruning.

34. The system of claim 30, wherein the raw data comprises raw graphical data, and the computer program comprises a handwriting recognition program.

35. The system of claim 30, wherein the raw data comprises raw voice data, and the computer program comprises a speech recognition program.

36. The system of claim 30, wherein the raw data comprises phonetic alphabet data, and the computer program comprises a program designed to convert the phonetic alphabet data to character alphabet data.

37. The system of claim 36, wherein the phonetic alphabet data comprises Chinese phonetic alphabet data.

38. The system of claim 36, wherein the phonetic alphabet data comprises Japanese phonetic alphabet data.

* * * * *